(12) United States Patent
Tordo

(10) Patent No.: US 10,972,044 B2
(45) Date of Patent: Apr. 6, 2021

(54) SOLAR TRACKER

(71) Applicant: NEXANS SOLAR TECHNOLOGIES, Cháteauneuf-le-Rouge (FR)

(72) Inventor: Jérome Marc Tordo, Aix-en-Provence (FR)

(73) Assignee: NEXANS SOLAR TECHNOLOGIES, Chateauneuf-le-Rough (FR)

( * ) Notice: Subject to any disclaimer, the term of this patent is extended or adjusted under 35 U.S.C. 154(b) by 187 days.

(21) Appl. No.: 16/325,628

(22) PCT Filed: Aug. 11, 2017

(86) PCT No.: PCT/EP2017/070512
§ 371 (c)(1),
(2) Date: Feb. 14, 2019

(87) PCT Pub. No.: WO2018/033495
PCT Pub. Date: Feb. 22, 2018

(65) Prior Publication Data
US 2019/0190442 A1 Jun. 20, 2019

(30) Foreign Application Priority Data

Aug. 17, 2016 (FR) ...................................... 16 01234
Feb. 17, 2017 (FR) ............................... 17 305 176.4

(51) Int. Cl.
*H02S 20/32* (2014.01)
*F24S 25/13* (2018.01)
(Continued)

(52) U.S. Cl.
CPC ............ *H02S 20/32* (2014.12); *F16B 7/0406* (2013.01); *F24S 25/13* (2018.05); *F24S 25/60* (2018.05);
(Continued)

(58) Field of Classification Search
CPC .......... F24S 25/60; F24S 30/425; F24S 25/13; F24S 25/70; F24S 2030/136;
(Continued)

(56) References Cited

U.S. PATENT DOCUMENTS 4,209,231 A * 6/1980 Sayre ..................... G02B 7/183
                                                                359/853
7,795,568 B2 * 9/2010 Sherman ................. H02S 20/32
                                                                250/203.4
(Continued)

FOREIGN PATENT DOCUMENTS

CL         201900402         2/2019
CN         103016628         4/2013
(Continued)

OTHER PUBLICATIONS

Chinese Office Action dated Jan. 6, 2020.
(Continued)

*Primary Examiner* — Alfred Basichas
(74) *Attorney, Agent, or Firm* — Sofer & Haroun, LLP

(57) ABSTRACT

The present invention concerns a solar tracker (1000) comprising at least:
  a mobile device (1100) comprising at least:
    a table (1110) comprising at least one solar energy collector device (1112);
    a support structure (1120);
    first support arch (1130) and a second support arch (1150) configured to support the support structure (1120);
  a first ground support (1140) and a second ground support (1160) configured to support the first support arch (1130) and the second support arch (1150), respectively;
  a kinematic drive device (1141);
the solar tracker (1000) being characterized in that:
(Continued)

the support structure (1120) is a beam formed of a lattice structure comprising:
at least one first, one second and one third longitudinal members;
a plurality of crossmembers;
a plurality of tie rods (1225).

19 Claims, 5 Drawing Sheets

(51) Int. Cl.
*F24S 30/425* (2018.01)
*F24S 25/70* (2018.01)
*F24S 25/60* (2018.01)
*F16B 7/04* (2006.01)
*F24S 30/00* (2018.01)

(52) U.S. Cl.
CPC ............ *F24S 25/70* (2018.05); *F24S 30/425* (2018.05); *F24S 2030/11* (2018.05); *F24S 2030/12* (2018.05); *F24S 2030/131* (2018.05); *F24S 2030/136* (2018.05); *Y02E 10/47* (2013.01)

(58) Field of Classification Search
CPC ............ F24S 2030/11; F24S 2030/131; F24S 2030/12; F16B 7/0406; H02S 20/30; H02S 20/10; Y02E 10/47; F24J 2/541; F24J 2/5233; F24J 2/5264; F24J 2002/5444; F24J 2002/5451; F24J 2002/5468; F24J 2/5413
See application file for complete search history.

(56) References Cited

U.S. PATENT DOCUMENTS

| | | |
|---|---|---|
| 9,447,991 B2* | 9/2016 | Michotte De Welle ................ H02S 20/00 |
| 2004/0238025 A1 | 12/2004 | Shingleton |
| 2008/0230047 A1 | 9/2008 | Shugar et al. |
| 2008/0308091 A1 | 12/2008 | Corio |
| 2013/0037088 A1* | 2/2013 | Thurner ............... F24S 25/70 136/251 |
| 2014/0054433 A1 | 2/2014 | Reisch |
| 2014/0069483 A1 | 3/2014 | Wolter |
| 2016/0013751 A1 | 1/2016 | Michotte De Welle et al. |
| 2019/0199277 A1* | 6/2019 | Tordo ............... F16B 7/0406 |

FOREIGN PATENT DOCUMENTS

| | | |
|---|---|---|
| CN | 204650282 | 9/2015 |
| DE | 10 2006 027152 | 12/2007 |
| EP | 2154449 | 2/2010 |
| EP | 2 385 327 | 11/2011 |
| FR | 3003021 | 9/2014 |
| WO | 2008058411 | 5/2008 |
| WO | 2009/009915 | 1/2009 |
| WO | 2016/094864 | 6/2016 |

OTHER PUBLICATIONS

Chilean Office Action dated Jan. 31, 2020.
French Search Report dated Mar. 21, 2017.
EU Search Report dated Apr. 20, 2017.
International Search Report dated Oct. 16, 2017.

* cited by examiner

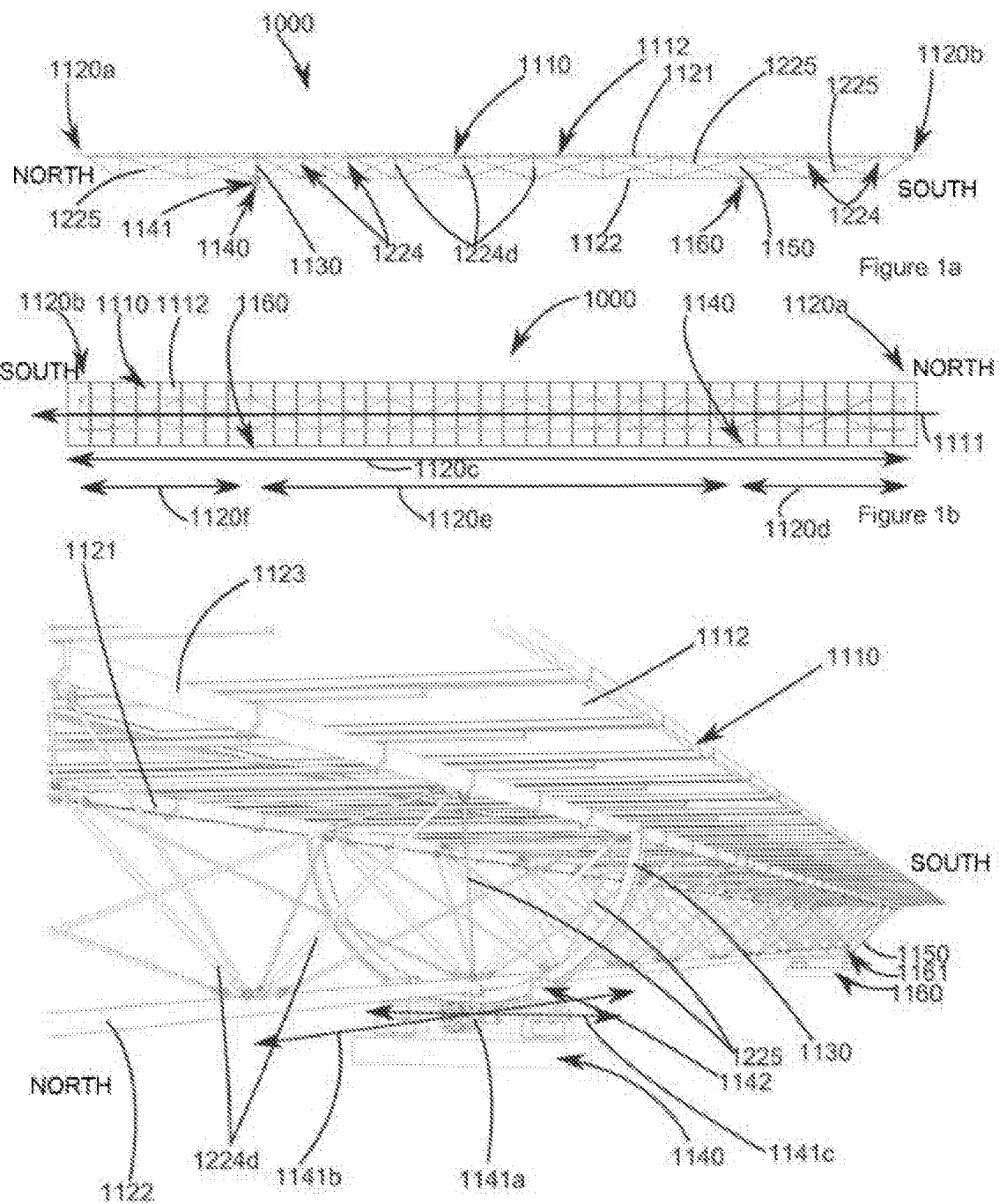

SOLAR TRACKER

RELATED APPLICATIONS

This application is a National Phase Application of PCT/EP2017/070512 filed on Aug. 11, 2017, which in turn claims the benefit of priority from French Patent Application No. 16 01234, filed on Aug. 17, 2016, and European Patent Application No. 17 305 176.4, Feb. 17, 2017, the entirety of which are incorporated herein by reference.

TECHNICAL FIELD OF THE INVENTION

The present invention concerns the field of solar energy in general and more particularly the field of solar trackers. It will find an advantageous application to solar fields for example.

PRIOR ART

Solar energy is today an energy at the core of numerous technological innovations. At a time when energy requirements are at their highest, numerous states worldwide are tending to large scale use of this renewable energy.

Whether this is by means of photovoltaic panels or solar reflectors, numerous problems are encountered with these solar installations.

One of the principal problematics resides in the alignment and the adjustment of the components of the tables of the solar trackers carrying the solar energy collector devices on their supports.

Indeed it is necessary to align them correctly and to motorize them in order for them to function without supplemental constraints.

One of the major stakes consists in obtaining a unit cost of the collected energy that is as low as possible. Reducing this cost entails increasing the yield of the solar fields, but also reducing the installation and maintenance costs of these solar fields. Now, in this context, the cost and the difficulty of installing motorized tables depend greatly on the terrain on which they are constructed. Indeed, it is difficult to find a perfectly flat terrain in order to dispose there lines of tables over very long distances.

One solution then resides in the production of tables having small dimensions in order to be able to dispose them between the irregularities of the terrain. However, known solutions then incur a high cost both in terms of installation and maintenance and also in terms of management.

Another solution is then based on managing and terracing the terrain before installing the tables. However, this also incurs equally high costs and equally long installation times. All these disadvantages reduce the motivation of some states to invest in this type of technology.

Current solutions for compensating irregularities of the ground are therefore based primarily on structuring the terrain, on adjusting the alignment of the lines of reflectors or on a high density of non-aligned tables.

Faced with this problematic, the current solutions therefore remain very costly and very complex.

The present invention aims to limit or even to solve at least some of the problematics referred to above.

SUMMARY OF THE INVENTION

The present invention concerns a solar tracker comprising at least:
a mobile device comprising at least:
- a table extending longitudinally in a principal extension direction and comprising, and preferably being configured to support, at least one solar energy collector or reflector device, preferably comprising at least one photovoltaic panel;
- a support structure extending longitudinally over a length L in the principal extension direction and preferably on its own supporting the table and comprising a first end and a second end;
- a first support arch and a second support arch configured to support the support structure, and preferably fastened to the support structure;
- a first ground support and a second ground support configured to support the first support arch and the second support arch, respectively;
- a kinematic drive device, preferably fastened to the first ground support, configured to drive the mobile device in rotation relative to the first ground support and the second ground support.

The support structure is a beam formed by a lattice structure.

The lattice structure preferably comprises at least one first, one second and one third longitudinal member parallel to one another and extending in the principal extension direction.

The mobile device is preferably configured in such a manner that the beam is entirely supported by the first support arch and the second support arch.

The solar tracker preferably comprises rolling members mounted to rotate on the first ground support and the second ground support, the rolling members being configured in such a manner as to guide the rotation of the first arch and the second arch and to support on their own the mobile device.

The technical features of this solar tracker act synergistically on the one hand to withstand effectively dynamic mechanical stresses linked to temperature or again to wind and on the other hand to be able to disregard at least some of the static irregularities of the ground, whilst having a very limited cost.

Indeed, the solar tracker according to said invention employs a lattice structure, in accordance with the mechanical definition thereof, in which each element preferably contributes to the resistance of the solar tracker to static and dynamic mechanical stresses.

The present invention therefore makes it possible to increase the load capacity (and therefore the solar energy collection area) of the mobile device whilst considerably reducing its weight. It therefore enables the production of solar trackers of large size resting on only two ground supports and comprising a drive system, preferably only one drive system.

At a location where the prior art would use a plurality of tables of small size and a plurality of complex and costly drive systems, the present invention enables the use of a single table of large size, preferably resting only on two ground supports, and a single drive system.

Thus the present invention circumvents the problem of synchronization between two aligned tables by proposing a structure the principal extension dimension of which is greater than that of a plurality of prior art tables.

The present invention advantageously makes it possible to produce a solar tracker having a principal dimension greater than 30 m, and therefore a large solar energy collecting area, at a limited cost.

The present invention makes it possible to facilitate the installation and maintenance of a solar field, thus making it possible to increase its cost-effectiveness.

The present invention also enables pre-assembly of the mobile device, in a workshop, which may be mobile, situated at a distance from the operating site.

Thus the present invention enables installation of the mobile device as a single unit already pre-assembled in the factory or in a mobile workshop.

The present invention also concerns a solar field comprising a plurality of solar trackers according to any one of the preceding claims, at least some of the solar trackers being disposed parallel to one another, preferably in the North/South direction.

BRIEF DESCRIPTION OF THE FIGURES

The aims, objects, the features and advantages of the invention will emerge more clearly from the detailed description of embodiments thereof that are illustrated by the accompanying drawings, in which:

FIGS. 1a and 1b are two profile views of a solar tracker in accordance with one nonlimiting embodiment of the present invention. In FIG. 1a the table of this solar tracker is horizontal. In FIG. 1b the table of this solar tracker is inclined.

FIGS. 2a to 2f are two perspective views of a solar tracker from FIG. 1a and 1b in accordance with one nonlimiting embodiment of the present invention. In FIG. 2a the table of this solar tracker is horizontal. In FIG. 2b the table of this solar tracker is inclined. FIG. 2c is a view of a first support arch carried by a first ground support and a rotation kinematic drive device. FIG. 2d is a view of a rotation kinematic drive device. FIG. 2e shows support rollers mounted to rotate on a ground support. FIG. 2f is a view of a second support arch carried by a second ground support.

FIG. 3a is a perspective view of a part of a support structure of the solar tracker. FIG. 3b is a perspective view of the support structure of the solar tracker when the table is inclined. FIG. 3c is a perspective view of a part of the support structure.

Figure 2B:
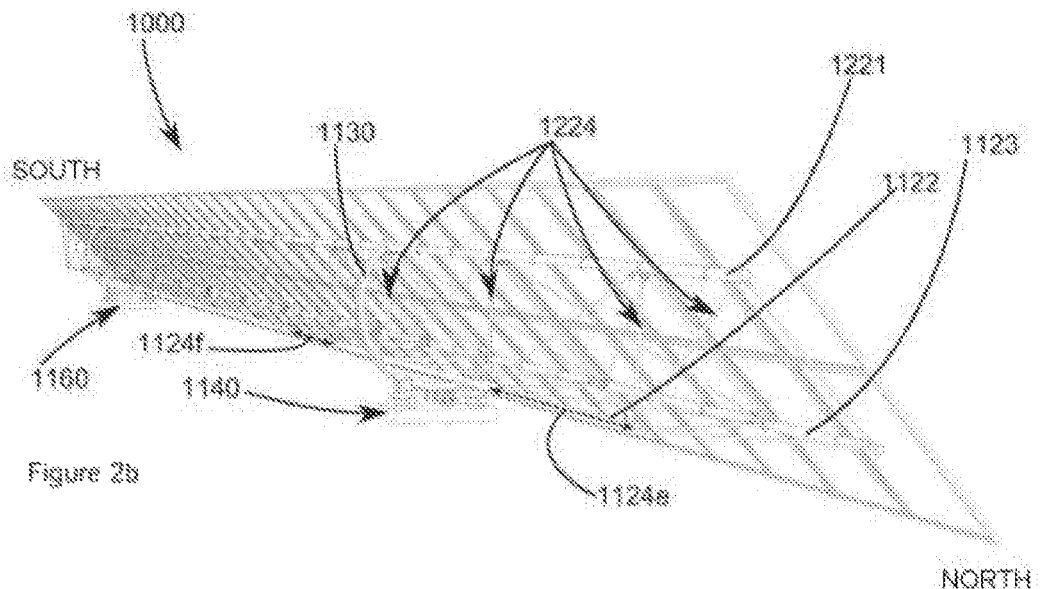

The appended drawings are provided by way of example and are not limiting on the invention. These drawings are diagrammatic representations and are not necessarily to the scale of the practical application.

DETAILED DESCRIPTION OF THE INVENTION

It is specified here that in the context of the present invention the term "solar energy collector device" or its equivalents has the following definition: a device configured to convert directly or indirectly solar energy into another form of energy. A device of this kind may be for example a photovoltaic panel, a solar reflector, a thermal solar panel or again a solar concentrator for example.

It is specified here that in the context of the present invention the terms "beam", "lattice structure" and their equivalents have the following definition: a mechanical structure comprising longitudinal members connected by crossmembers and tie rods, the whole preferably forming a rigid, preferably triangulated structure. Without this being limiting on the invention, each structural element (longitudinal member, crossmember, tie rod) is preferably configured, shaped and positioned to enable the lattice structure to withstand a predetermined mechanical stress, typically the maximum load capacity. In this type of structure, each structural element is preferably indispensable for supporting said maximum load capacity. For a mechanical stress, typically its load capacity, all the crossmembers and preferably all the tie rods are loaded, preferably in tension.

It is specified here that in the context of the present invention the term "kinematic" and its equivalents have the following definition: the set of parameters, physical characteristics that can be used to describe a movement of a body in a frame of reference.

Before undertaking a detailed review of embodiments of the invention, there are set out hereinafter optional features that may be used in conjunction or alternatively:

In one embodiment, the lattice structure also comprises at least one plurality of crossmembers distributed along the principal extension direction and interconnecting the first, second and third longitudinal members so that the crossmembers form a plurality of triangles.

At least some of the triangles are preferably contained in a plane perpendicular to said principal extension direction.

In one embodiment, the lattice structure also comprises a plurality of tie rods, preferably extending primarily in the principal extension direction and mechanically stressing in tension the support structure by mechanically interconnecting at least two triangles of the plurality of triangles.

The first support arch and the second support arch are preferably respectively situated at a first distance L1 from the first end and at a second distance L3 from the second end of the support structure so that the first end and the second end of the support structure are cantilevered relative to the first support arch and the second support arch.

The first distance L1 and the second distance L3 are advantageously between L/9 and L/2 inclusive, preferably between L/6 and L/2.5 inclusive and advantageously equal to L/3, L being the dimension of the support structure in said principal extension direction; L is typically the distance between the first and second ends.

This makes it possible for the support structure to be cantilevered from the first ground support and the second ground support, in order to distribute the load on either side of the ground supports. This makes it possible to reduce the deflection and the weight of the support structure whilst maintaining a high load and a high resistance to mechanical stresses.

The plurality of triangles is advantageously disposed along said principal extension direction with an irregular distribution.

This makes it possible to increase the resistance of the support structure to mechanical stresses, for example torsion stresses.

In one nonlimiting embodiment, the irregular distribution of the plurality of triangles along said principal direction has a higher density of triangles at the level of at least one of the first support arch and the second support arch, preferably at the level of the first support arch.

This makes it possible to increase the mechanical strength of the structure at the level of the support arch nearest the kinematic drive device. It is at this point of the structure that the mechanical stresses are highest when the support structure is rotated.

The distance between two consecutive triangles in the principal extension direction is advantageously equal to P1 between the first end and the first support arch, equal to P3 between the second support arch and the second end, and equal to P2 between the first support arch and the second support arch, with P3 being equal to P1 and P2 being less than or equal to P1.

This technical feature makes it possible to improve further the load capacity/weight ratio of the solar tracker. It therefore makes it possible to increase the energy collected at limited cost.

P2 is advantageously equal to $P1*(d/L2)$, d being the distance in the principal extension direction between the triangle concerned and the first support arch and L2 being the distance between the first support arch and the second support arch.

The solar tracker in accordance with the present invention advantageously comprises at least one, preferably at least two and advantageously at least three triangles between the first end and the first support arch.

This technical feature makes it possible to increase further the load capacity/weight ratio of the solar tracker. It thus makes it possible to increase the energy collected at limited cost.

The solar tracker in accordance with the present invention advantageously comprises at least four, preferably at least five and advantageously at least seven triangles between the first support arch and the second support arch.

This technical feature makes it possible to increase further the load capacity/weight ratio of the solar tracker. It therefore makes it possible to increase the energy collected at limited cost.

The distance between two consecutive triangles disposed between the first support arch and the second support arch advantageously increases as a function of their distance from the first support arch and/or the second support arch.

This technical feature makes it possible to increase further the load capacity/weight ratio of the solar tracker. It therefore makes it possible to increase the energy collected at limited cost. Similarly, this technical feature makes it possible to increase further the load capacity/torsion resistance ratio of the solar tracker.

At least one, preferably at least two and advantageously at least three triangles of the plurality of triangles are advantageously situated between the second support arch and the second end.

The first ground support and the second ground support are preferably anchored in or poured in the ground.

The kinematic drive device is advantageously disposed at the level of said first ground support.

At least one crossmember of the plurality of crossmembers is advantageously disposed relative to the first support arch along its diameter, this crossmember preferably defines a diameter of the first support arch, at least one crossmember of the plurality of crossmembers is preferably disposed relative to the second support arch along its diameter, and this crossmember preferably defines a diameter of the second support arch.

At least one crossmember is advantageously disposed relative to the first support arch along its diameter.

This technical feature makes it possible to increase further the load capacity/weight ratio of the solar tracker. It therefore makes it possible to increase the energy collected at limited cost.

At least one crossmember is advantageously disposed relative to the second support arch along its diameter.

At least some of the triangles advantageously extend in planes orthogonal to the principal extension direction.

The triangles of the plurality of triangles are advantageously equilateral triangles.

The triangles are advantageously equilateral triangles and the triangles advantageously extend in planes orthogonal to the principal extension direction.

This enables the support structure to distribute homogeneously the mechanical stresses to which the support structure is subjected.

Each triangle advantageously comprises:
at least one first apex disposed at the level of the first longitudinal member;
at least one second apex disposed at the level of the second longitudinal member;
at least one third apex disposed at the level of the third longitudinal member;
and each first apex of a triangle is advantageously connected via at least one tie rod of the plurality of tie rods to at least one second apex and to at least one third apex of at least one other triangle, and preferably to the second apex and the third apex of each triangle contiguous with it.

This makes it possible to increase the load capacity of the support structure.

Each second apex of a triangle is advantageously connected via at least one tie rod to at least one first apex and to at least one third apex of at least one other triangle, and preferably to the first apex and the third apex of each triangle contiguous with it.

Each third apex of a triangle is advantageously connected via at least one tie rod to at least one first apex and to at least one second apex of at least one other triangle, and preferably to the first apex and the second apex of each triangle contiguous with it.

Each triangle advantageously comprises:
at least one first apex disposed at the level of the first longitudinal member;
at least one second apex disposed at the level of the second longitudinal member;
at least one third apex disposed at the level of the third longitudinal member;
and at least one first tie rod advantageously connects at least one first apex of the first triangle to the second apex of a second triangle,
and at least one second tie rod advantageously connects at least one first apex of a first triangle to the third apex of a second triangle,
and at least one third tie rod advantageously connects at least one second apex of a first triangle to the first apex of the second triangle,
and at least one fourth tie rod advantageously connects at least one second apex of a first triangle to the third apex of a second triangle,
and at least one fifth tie rod advantageously connects at least one third apex of a first triangle to the first apex of a second triangle,
and at least one sixth tie rod advantageously connects at least one third apex of a first triangle to the second apex of a second triangle.

The tie rods advantageously have lengths that vary relative to one another.

At least some of the tie rods advantageously have diameters that vary relative to one another.

The section, typically the diameter, of at least some of the tie rods is advantageously proportional to their length.

The section of the tie rods is advantageously that in a plane perpendicular to their principal extension direction.

The length of at least one tie rod disposed between the first end and the first support arch is advantageously equal to the length T1, that between the second support arch and the second end is advantageously equal to the length T3, and that between the first support arch and the second support arch is advantageously equal to the length T2, with T3 being equal to T1 and T2 being less than or equal to T1.

The section, typically the diameter, of a tie rod disposed between the first end and the first support arch is advantageously equal to D1, that between the second support arch and the second end is advantageously equal to D3, and that between the first support arch and the second support arch is advantageously equal to D2, with D3 being equal to D1 and D2 being less than or equal to D1.

At least some of the tie rods are advantageously fastened, preferably bound, together, two by two, preferably at their middle, when they cross.

The beam formed of a lattice structure is advantageously continuous and demountable and preferably transportable.

The beam formed of a lattice structure is advantageously continuous.

The beam formed of a lattice structure is advantageously demountable.

The beam formed of a lattice structure is advantageously transportable.

The first ground support advantageously comprises at least two support rollers forming a rolling member and configured to roll on a rolling strip carried by the first support arch and configured to support on their own and to guide the first support arch and the kinematic drive device advantageously comprises a transmission member configured to cooperate with a complementary transmission member carried by the first support arch so as to enable the first support arch to be driven in rotation relative to the first ground support.

In one embodiment the transmission member carried by the drive device is a pinion or a toothed wheel and the transmission member carried by the first support arch is a curved rack, preferably a toothed surface that espouses the shape of the first support arch.

In another embodiment, the transmission member carried by the drive device and the transmission member carried by the first support arch comprise a set of cables, advantageously with idler pulleys.

The second ground support advantageously comprises at least two support rollers forming a rolling member and configured to roll on a rolling strip carried by the second support arch and configured to support on their own and to guide the rotation of the second support arch relative to the second ground support.

The length L of the support structure is advantageously between 10 m and 45 m inclusive, preferably between 20 m and 42 m inclusive and advantageously between 28 m and 42 m inclusive.

The first ground support advantageously comprises at least one sole disposed on the ground and at least two feet fastened to the sole and supporting on their own the rolling members via an inclination take-up bar mounted to rotate freely about an inclination take-up axis perpendicular to the principal extension direction.

The second ground support advantageously comprises at least one sole disposed on the ground and at least two feet fastened to the sole and supporting on their own the rolling members via an inclination take-up bar mounted to rotate freely about an inclination take-up axis perpendicular to the principal extension direction.

Said at least one solar energy collector device advantageously comprises at least 72 photovoltaic panels necessitating only two ground supports.

This makes it possible to limit environmental damage, for example by limiting the groundworks necessary for installing the solar tracker. Indeed, for a solar tracker approximately 36 meters long, for example, the fact that the latter rests on only two ground supports concentrates the groundworks at the level of those two ground supports. Moreover, the use of only two ground supports enables better adaptation to the variations in slope of the ground on which the solar tracker in accordance with the present invention is installed.

The mobile device is advantageously pre-assembled in a factory or in a mobile workshop so as to be installable, preferably directly, on the first ground support and on the second ground support once it has arrived at a solar energy production site.

The present invention finds a preferred field of application in the production of solar fields, i.e. expanses of lines of tables including solar energy collector devices that may be photovoltaic panels or reflectors or again solar concentrators.

As described hereinafter, the present invention notably solves problematics of mechanical resistance to dynamic mechanical stresses such as the wind or temperature variations for example as well as the alignment of tables on terrain featuring static irregularities whilst having a reduced weight and a limited cost.

A first source of dynamic irregularities to which a solar tracker is subjected, but that are not generated by the terrain itself, arises from thermal expansion of the materials constituting the solar tracker.

For example, in a desert environment the ground temperature may be very high during the day and very low during the night. The present invention, in addition to adapting to static and dynamic irregularities of the terrain, also adapts to irregularities of a thermal order.

Moreover wind, generally non-negligible in solar fields, is a major source of mechanical stresses when the requirement is to provide a solar tracker of large size.

Finally, although a terrain may feature along a North/South axis altitude differences variable over a greater or lesser distance relative to the table, it may also feature composition differences of geological origin or even greater or lesser dynamic irregularities responsible for differential settlement.

The present invention makes it possible to provide a solar tracker having a high load capacity and a low weight and enables adaptation of the solar tracker to static and dynamic environmental constraints. This solar tracker advantageously exploits a so-called lattice support structure the elements of which, preferably all of them, participate in the transmission of loads and mechanical stresses.

The present invention will now be described by means of a plurality of figures serving as illustrations of embodiments of the present invention. Unless otherwise specified, each of the features described with reference to a given embodiment is applicable to the other embodiments.

FIG. 1a is a profile view of a solar tracker 1000 in accordance with one embodiment of the present invention. This solar tracker 1000 extends in a principal extension direction 1111 preferably substantially parallel to the North/South axis.

This solar tracker 1000 advantageously comprises a mobile device 1100, a first ground support 1140 and a second ground support 1160.

This mobile device 1100 preferably comprises a table 1110 comprising a plurality of solar energy collector devices 1112.

This mobile device 1100 advantageously comprises a support structure 1120 configured to support the table, preferably on its own.

The support structure 1120 has a length dimension L in the principal extension direction of the solar tracker 1000.

This support structure 1120 has a first end 1120a and a second end 1120b between which the solar energy collector devices 1112 are preferably disposed.

In a preferred embodiment, the mobile device 1100 comprises a first support arch 1130 and a second support arch 1150, each being configured to support the support structure 1120.

The first ground support 1140 and the second ground support 1160 are respectively configured to support the first support arch 1130 and the second support arch 1150.

In a preferred embodiment, the first support arch 1130 is disposed at a distance from the first end 1120a substantially equal to L/3, preferably between 0.5*L/3 and 1.5*L/3 inclusive.

In one embodiment, the second support arch 1150 is disposed at a distance from the second end 1120b substantially equal to L/3, preferably between 0.5*L/3 and 1.5*L/3 inclusive.

In a particularly advantageous manner, the support structure 1120 is cantilevered from the first ground support 1140 via the first support arch 1130 and from the second ground support 1160 via the second support arch 1150.

The cantilevered support structure 1120 enables an advantageous distribution of the mechanical stresses to which the support structure 1120 is subjected, enabling a reduction of the weight and the deformation (deflection) of the mobile device 1100 whilst maintaining a high mechanical strength.

As shown in FIG. 1a, the solar tracker 1000 comprises a kinematic drive device 1141, preferably disposed at ground level, and advantageously disposed at the level of the first ground support. This kinematic drive device 1141 is configured to drive the support structure 1120 in rotation with a rotation movement about an axis colinear with the principal extension direction 1111 of the solar tracker 1000 so that the table 1110, and therefore the plurality of solar energy reflector devices 1112, can track the movement of the sun in the sky. FIG. 1b is a profile view of the mobile device 1100 in which the table 1110 is inclined toward the west via the kinematic drive device 1141.

In one embodiment, the kinematic drive device 1141 comprises a drive system 1141a, preferably mechanically coupled to the first support arch 1130. This mechanical coupling may advantageously be produced by any type of mechanical drive system, for example gears, rack and pinion.

For example, the output shaft of the motor carries a pinion that meshes directly or indirectly with a preferably complementary profile carried by a curved rack or an arc of a toothed wheel fastened to the first arch. In another embodiment, the complementary transmission member comprises a chain that cooperates with the a sprocket and drives the arch in rotation. The complementary profile may define a center of rotation coinciding with that of the first arch. The complementary profile is preferably carried by an external face of the arch facing the ground.

In other embodiments, the kinematic drive device 1141 is configured to cooperate with the first support arch 1130 by means of a friction drive system for example, or a sprocket/chain system, or any other type of mechanical rotation drive system.

The first ground support 1140 and the second ground support 1160 very advantageously comprise guide devices 1142 and 1161 enabling the first support arch 1130 and the second support arch 1150 to be guided in rotation about the rotation axis of the solar tracker 1000 as shown in FIG. 1b. Each of the guide devices 1142 and 1161 preferably comprises rolling members. In these examples shown here, these rolling members are support rollers 1142a, 1142b, 1161a and 1161b. This kinematic drive device 1141 and the guide devices 1142 and 1161 are described hereinafter.

In an advantageous embodiment, the guide devices support the arches. The support rollers preferably support the arches on their own. Thus all the weight of the support structure and the table are supported by the rollers. The structure is therefore rendered extremely minimalistic, which enables its weight to be reduced and its load capacity to be increased. The tracker in accordance with this embodiment of the invention therefore comprises no post anchored in the ground that supports the arches.

The support structure 1120 particularly advantageously comprises at least three longitudinal members 1121, 1122 and 1123 (or even four in a non-preferred embodiment), each extending in a colinear manner in the principal extension direction 1111, and preferably parallel to one another.

This support structure 1120 also comprises crossmembers 1224d distributed along the three longitudinal members 1121, 1122 and 1123 and configured to connect each of the three longitudinal members 1121, 1122 and 1123 mechanically two by two.

The crossmembers 1224d are preferably disposed relative to the three longitudinal members 1121, 1122 and 1123 so as to form parallel triangles 1224 preferably extending in planes orthogonal to the principal extension direction 1111.

In a particularly advantageous manner, the density of triangles 1224 is greater at the level of the first support arch 1130 relative to the second support arch 1150, in order to increase the mechanical strength of the support structure 1120 at the level of the first support arch 1130 carried by the first ground support 1140 comprising the kinematic drive device 1141. These triangles 1224 will be described more precisely in the remainder of the description.

As shown in this figure and in a preferred embodiment, the support structure 1120 comprises tie rods 1225. These tie rods 1225 are disposed so as to interconnect the triangles 1224, preferably two by two. These tie rods 1225 are advantageously stressed in tension so as to increase the mechanical strength of the support structure 1120.

Two tie rods 1225 crossing substantially in their middle are preferably bound to one another.

As stated above, FIG. 1b shows a solar tracker 1000 in accordance with one embodiment of the present invention the table 1110 of which is inclined toward the west, in order to track the movement of the sun in the sky. This inclination is made possible by the use of the support arches 1130 and 1150 configured to be driven with a movement in rotation by the kinematic drive device 1141 and resting on support rollers 1142a, 1142b, 1161a and 1161b. These various elements are described further with reference to the subsequent figures.

FIG. 2a is a perspective view of a solar tracker 1000 in accordance with one embodiment. There will be noted in this figure the relative disposition of the longitudinal members 1121, 1122 and 1123 as well as of the first support arch 1130 and the second support arch 1150.

In this figure is found the first ground support 1140 comprising the kinematic drive device 1141.

This kinematic drive device 1141 is advantageously mounted on an inclination take-up bar 1140c defining an inclination take-up axis 1141c perpendicular to the principal rotation axis 1141b of the kinematic drive device 1141. This inclination take-up axis 1141c is on the first ground support 1140 and the kinematic drive device 1141 and preferably the first support arch 1130 are mobile relative to this inclination take-up axis 1141c thus enabling adaptation of the support structure 1120 at least in part to some of the static irregularities, and also dynamic irregularities, of the ground, temperature, or even the wind.

In this figure, and in a particularly advantageous manner, the support structure 1120 comprises a first longitudinal member 1121, a second longitudinal member 1122 and a third longitudinal member 1123, each extending in a colinear manner in the principal extension direction 1111, and preferably parallel to one another.

As indicated above, the crossmembers 1224d are disposed relative to the longitudinal members 1121, 1122 and 1123 so as to form triangles 1224 the apices 1224a, 1224b, 1224c of which are carried at least in part by the longitudinal members 1121, 1122 and 1123. Thus three crossmembers 1224d connect the three longitudinal members 1121, 1122 and 1123 in such a manner as to form a preferably equilateral triangle 1224.

These triangles 1224 advantageously have dimensions enabling them to be inscribed in the first support arch 1130 and/or the second support arch 1150.

In one embodiment, at least one crossmember 1224d is disposed relative to the first support arch 1130 so as to define its diameter. At least some of the triangles 1224 are advantageously inscribed in the first support arch and/or in the second support arch 1150.

In another embodiment, at least one crossmember 1224d is disposed relative to the second support arch 1150 so as to define its diameter.

The first support arch 1130 is preferably fastened to the first longitudinal member 1121 at the level of one end of the first support arch 1130 and the distance between the first longitudinal member 1121 and this end of the first support arch 1130 is less than or equal to 0.1 times the diameter of the first support arch 1130, preferably 0.1 times the length of the crossmember 1224d connecting the first longitudinal member 1121 to the third longitudinal member 1123.

The second support arch 1150 is preferably fastened to the first longitudinal member 1121 at the level of one end of the second support arch 1150 and the distance between the first longitudinal member 1121 and that end of the second support arch 1150 is advantageously less than or equal to 0.1 times the diameter of the second support arch 1150, preferably 0.1 times the length of the crossmember 1224d connecting the first longitudinal member 1121 to the third longitudinal member 1123.

In this figure are also shown, in more detail, the tie rods 1225. As indicated above, the tie rods 1225 connect the apices 1224a, 1224b and 1224c of a triangle 1224 to the two triangles that are contiguous with it. The tie rods 1225 preferably interconnect the apices of triangles contiguous to one another.

Thus, for example, one tie rod 1225 connects the first apex 1224a of a triangle 1224 to the second apex 1224b of another triangle, and another tie rod 1225 connects this first apex 1224a to the third apex 1224c of the other triangle.

Each apex of a triangle 1224 is advantageously connected to two apices of another, contiguous triangle 1224, and preferably to two apices of two other contiguous triangles 1224.

In one embodiment, these tie rods 1225 are assembled while prestressed, preferably in tension, so as to provide mechanical reinforcement of the support structure 1120, making it possible to increase the load capacity of the support structure 1120 without significantly increasing its weight.

Figure 2C:
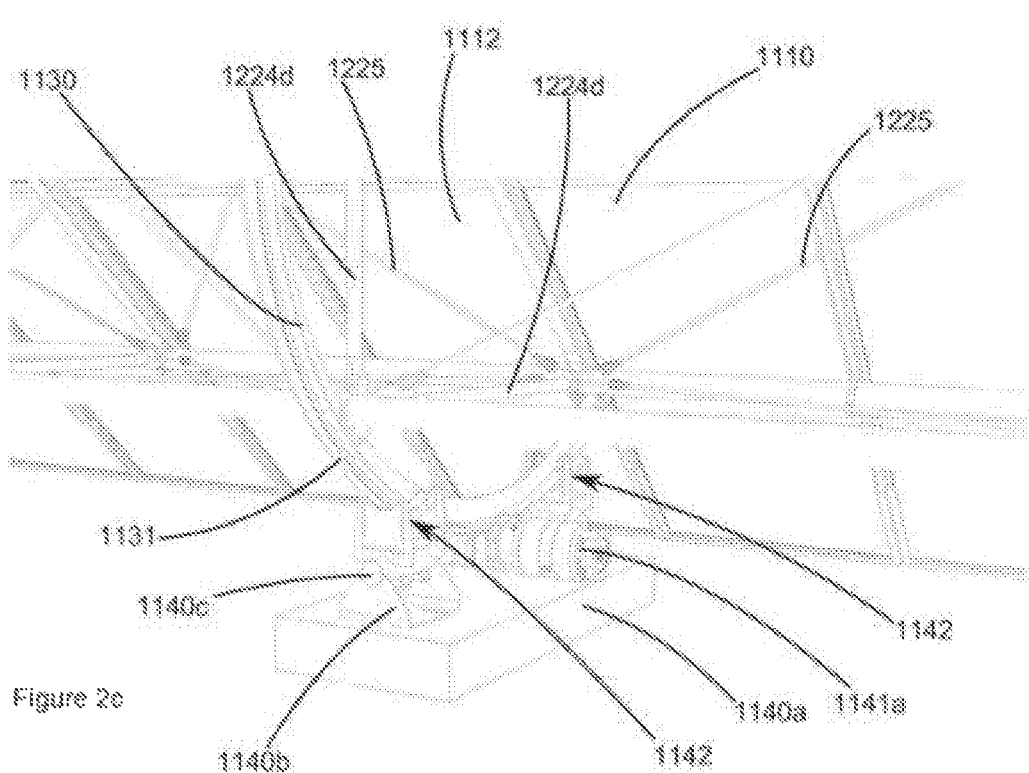

FIGS. 2b and 2c show the solar tracker 1000 inclined toward the west as in FIG. 1b. In FIG. 2b there will be noted the relative disposition of the first support arch 1130 and the first ground support 1140 and that of the second support arch 1150 and the second ground support 1160.

Note in FIG. 2b that the second longitudinal member 1122 may have a length less than that of the first longitudinal member 1121 and the third longitudinal member 1123.

This FIG. 2b also shows the cantilevering of the support structure 1120 from the first ground support 1140 and the second ground support 1160.

FIG. 2c shows more precisely the mechanical coupling between the first support arch 1130 and the first ground support 1140 via the kinematic drive device 1141 and two guide devices 1142 comprising at least one upper support roller 1142a and at least one lower support roller 1142b.

Note in this FIG. 2c the advantageous presence of a rolling strip 1131 disposed in one embodiment on the external surface of the first support arch 1130.

For example, the radial section of a support arch has an inverted "T" shape. The top of the crossbar of the "T", facing the ground, carries the profile configured to mesh with the kinematic drive device 1141. The top of the crossbar of the "T" also carries external rolling strips on which the lower support rollers 1142b are intended to roll. The underside of the crossbar of the "T" carries internal rolling strips on which the upper support rollers 1142a are intended to roll. The internal and external rolling strips are preferably disposed in line with one another. Thus each support arch 1130 and 1150 comprises four rolling strips. Each support arch 1130 and 1150 is configured to cooperate with two guide devices 1142 and 1161, respectively. As shown in FIG. 2e, each guide device 1142 and 1161 includes four support rollers 1142a, 1142b, 1161a and 1161b each of which rolls on one of the rolling strips of the support arches 1130 and 1150. Thus two facing support rollers 1142a, 1142b fit tightly around the support arch. This particular configuration makes it possible to increase the accuracy of guidance and the transfer of weight from the table 1110 to the ground supports 1140 and 1160.

Figure 2D:
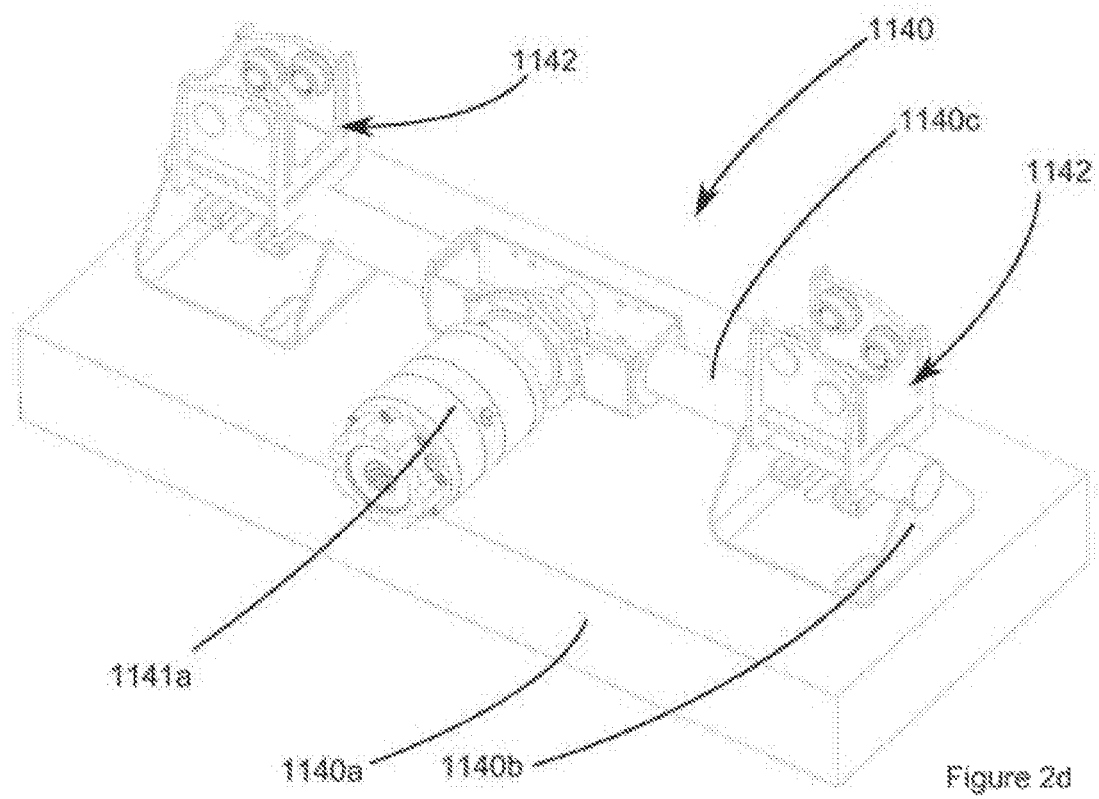
Figure 2E:
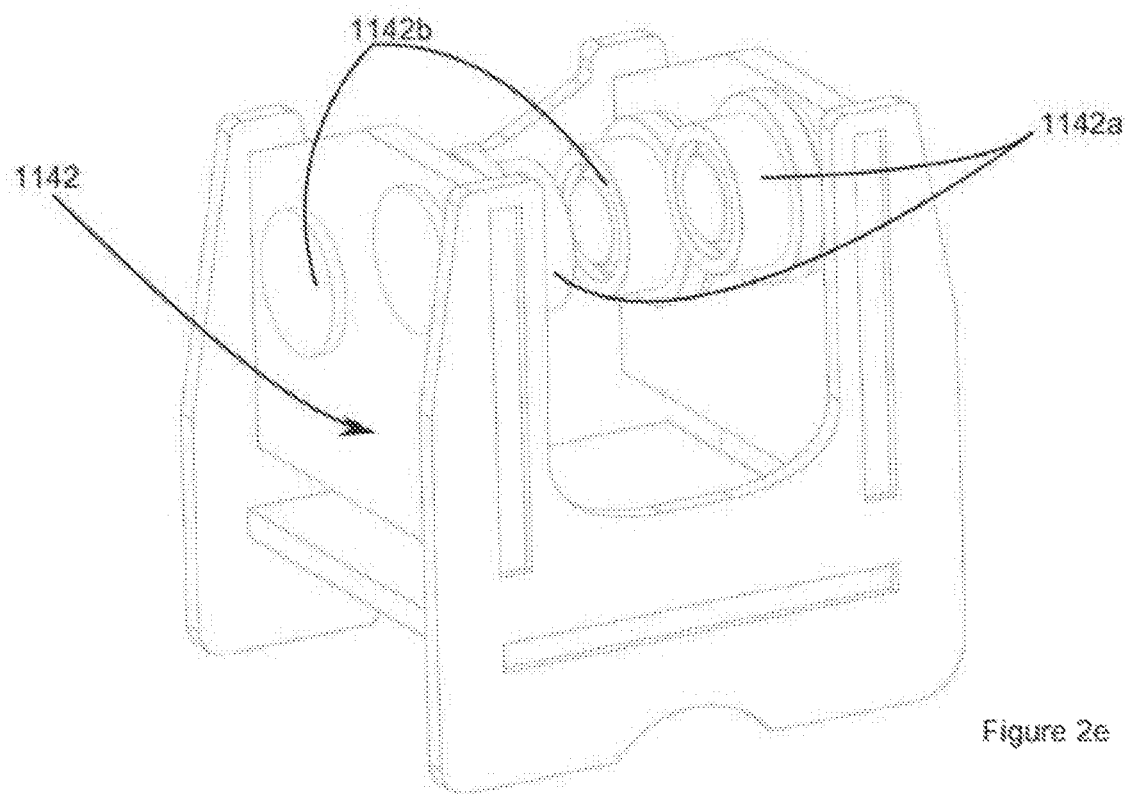

FIG. 2d shows the first ground support 1140 comprising the inclination take-up bar 1140c defining the inclination take-up axis 1141c. As indicated above, this inclination take-up axis 1141c enables the solar tracker 1000 to compensate at least in part some static and/or dynamic irregularities.

As shown in this embodiment, the first ground support 1140 comprises a, preferably concrete sole 1140a, preferably anchored in the ground or laid on the ground.

Two feet 1140b are placed on an upper face of the sole 1140a. In the embodiment shown, the feet 1140b have substantially a "U" shape the bottom of which features openings to receive bolts to fix the foot 1140b to the sole 1140a. Each foot 1140b supports, preferably on its own, a guide device 1142.

In the example shown in FIG. 2d, the ground support 1140 also comprises an inclination take-up bar 1140c that connects the two feet 1140b and defines the inclination take-up axis 1141c.

The inclination take-up bar 1140c, the feet 1140b and the guide device 1142 advantageously make possible a pivot connection in the transverse direction of the mobile device 1100 (perpendicular to the principal extension direction). These degrees of freedom in rotation make it possible to reduce or even to eliminate mechanical stresses at the level of the kinematic drive device 1141 by adapting to local flatness defects of the terrain. This moreover enables pre-assembly of the mobile device 1100 in a workshop before its installation on the solar energy production site without additional mechanical adjustments.

The inclination take-up bar 1140c advantageously has the function of transmitting forces between the two feet 1140b. In the case of the first ground support, which comprises the drive system 1141a, this inclination take-up bar 1140c also has the function of supporting that drive system 1141a. The inclination take-up bar 1140c comprises for example two circular section tubular end portions each fixed to a drive system support situated between the two end portions. The motor is fixed to this drive system support. The output shaft of the motor, which comprises a pinion or a sprocket, preferably projects beyond the drive system support in order to be accessible by the complementary profile carried by the first arch.

In a preferred embodiment, this inclination take-up bar 1140c is mounted to rotate freely about the inclination take-up axis 1141c on the two feet 1140b.

Each guide device 1142 is advantageously fastened to the inclination take-up bar 1140c so as to be mobile in rotation about the inclination take-up axis 1141c at the same time as the inclination take-up bar 1140c. The same may apply to the kinematic drive device 1141. A small rotation about the inclination take-up axis then enables compensation of some irregularities of the ground, for example, such as an altitude difference between the ground supports.

In another embodiment, the inclination take-up bar 1140c is fixedly mounted on the two feet 1140b, for example by welding it thereto, and it is the guide devices 1142 and the kinematic drive device that for their part are mounted to rotate freely about the inclination take-up axis 1141c.

In a further embodiment, the inclination take-up bar 1140c, the guide device 1142 and the kinematic drive device are all mounted to rotate freely about the inclination take-up axis 1141c.

These elements may advantageously be mounted to rotate freely during installation of the solar tracker in order to compensate static irregularities of the ground, and then fastened, for example welded, to one another.

In another even more advantageous embodiment, these elements are left mounted free to rotate about the inclination take-up axis 1141cde so as to enable adaptation of the solar tracker to dynamic irregularities of the ground.

In this FIG. 2d the first two guide devices 1142 are shown. They are preferably mounted on either side of the kinematic drive device 1141. They are advantageously mounted to rotate about the inclination take-up axis 1141c.

Figure 2F:
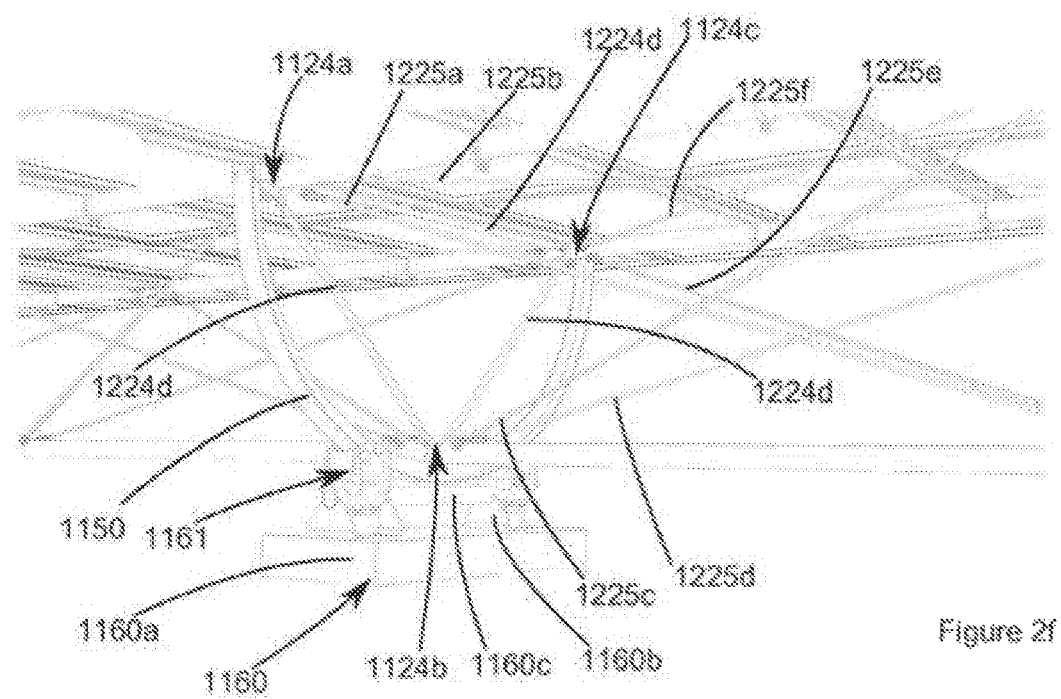

FIG. 2f shows the second ground support 1160 supporting the second support arch 1150 and including the second guide devices 1161. Note that the second ground support 1160 also comprises an inclination take-up axis 1161c perpendicular to the principal extension direction 1111 in exactly the same way as the first ground support 1140 and having an identical role of compensating at least in part some static and/or dynamic irregularities.

The first ground support 1140 and the second ground support 1160 are preferably identical except for the kinematic drive device 1141, which occupies the first ground support 1140.

Thus there are also found on the second ground support 1160a, preferably concrete, sole 1160a, preferably anchored in the ground or placed on the ground, and two feet 1160b placed on an upper face of the sole 1160a, each foot 1160b supporting, preferably on its own, a guide device 1161.

In this FIG. 2f are clearly visible the tie rods 1225 connecting the apices of the triangles 1224. Note therefore the first apex 1224a of a first triangle disposed at the level of the first longitudinal member 1121, the second apex 1224b of the first triangle disposed at the level of the second longitudinal member 1122 and the third apex 1224c of the first triangle disposed at the level of the third longitudinal member 1123.

A first tie rod 1225a advantageously connects the first apex 1224a of the first triangle to the second apex of a second triangle and a second tie rod 1225b advantageously connects the first apex 1224a of the first triangle to the third apex of the second triangle.

Similarly, a third tie rod 1225c connects the second apex 1224b of the first triangle to the first apex of the second triangle and a fourth tie rod 1225d connects the second apex 1224b of the first triangle to the third apex of the second triangle.

Finally, a fifth tie rod 1225e connects the third apex 1224c of the first triangle to the first apex of the second triangle and a sixth tie rod 1225f connects the third apex 1224c of the first triangle to the second apex of the second triangle.

This advantageous use of tie rods 1225 makes it possible to increase the mechanical strength of the support structure 1120 and thus to increase its load capacity.

Figure 3A:
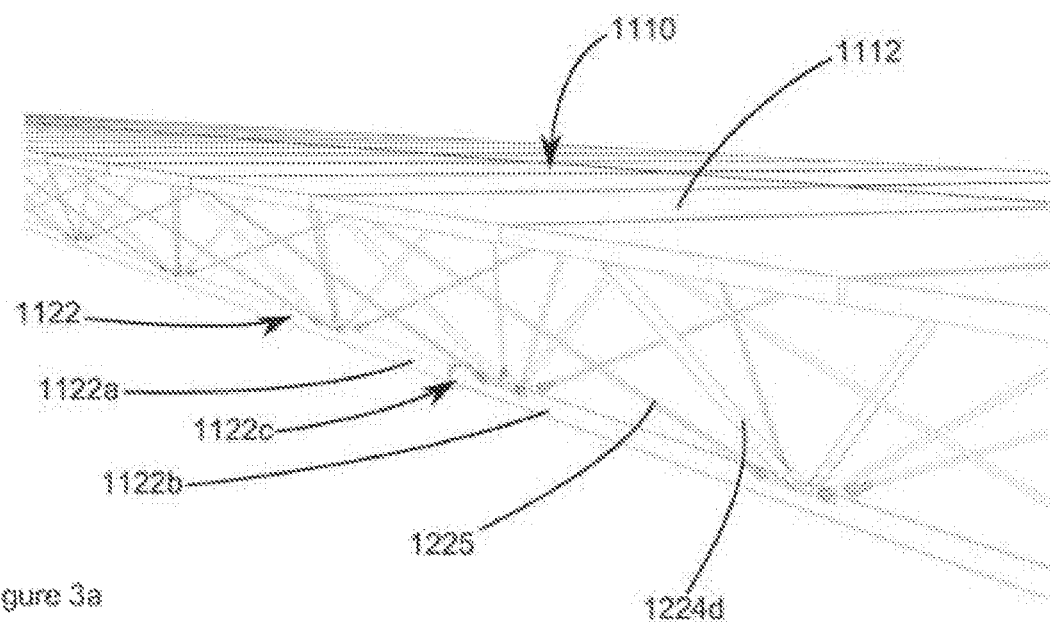
FIGS. 3a, 3b and 3c are different views of a solar tracker in accordance with the embodiment illustrated in the preceding figures.
Figure 3B:
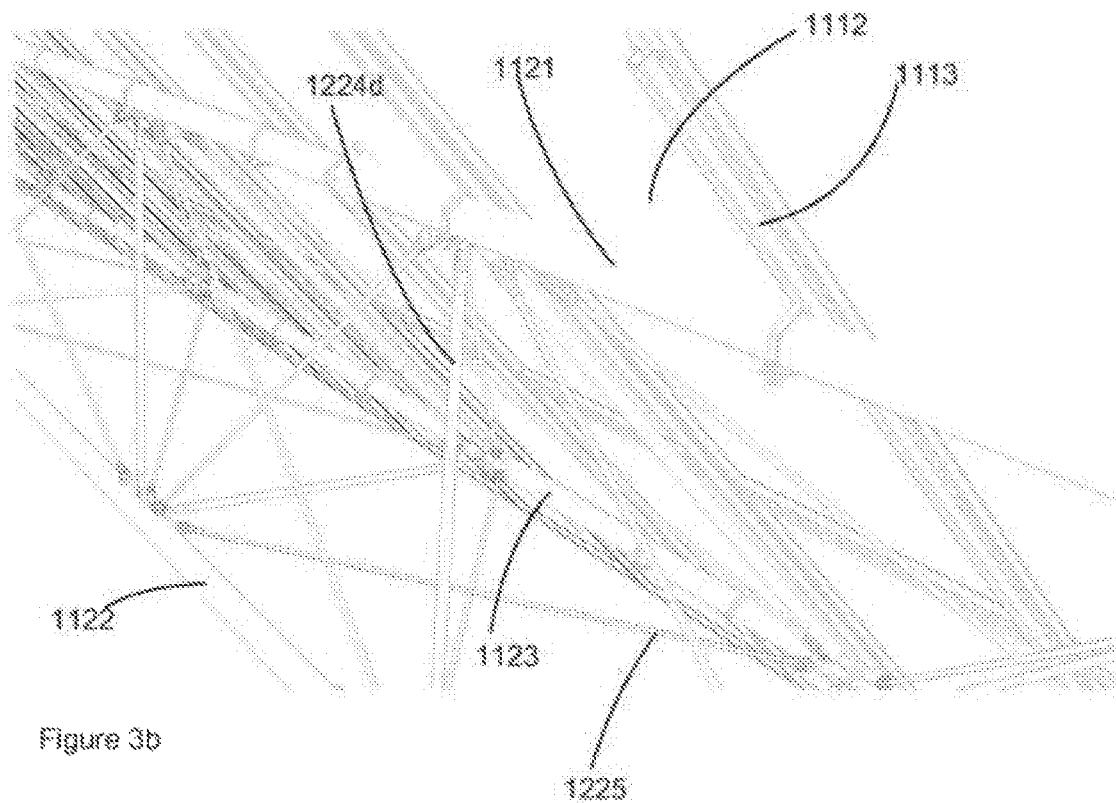

FIGS. 3a and 3b are perspective views of a part of the solar tracker 1000 in accordance with one embodiment. Note in this figure that the longitudinal members 1121, 1122 and 1123 may comprise a plurality of sections and are therefore easily demountable and transportable.

Note also that the apices 1224a, 1224b and 1224c of each triangle 1224 define a zone in which the tie rods 1225 are fastened to the longitudinal members 1121, 1122 and 1123.

Each apex 1224a, 1224b and 1224c is preferably formed of a part of the longitudinal member 1121, 1122 and 1123, fastening zones of two crossmembers 1224d and fastening zones of four tie rods 1225.

An apex of a triangle 1224 can thus be defined as comprising two crossmembers 1224d extending toward the other two apices of the same triangle 1224 and four tie rods 1225 extending toward four apices of two other triangles.

Note also in FIG. 3b that the solar energy collector devices 1112 are fastened to the first longitudinal member 1121 and the third longitudinal member 1123 via small beams 1113.

Figure 3C:
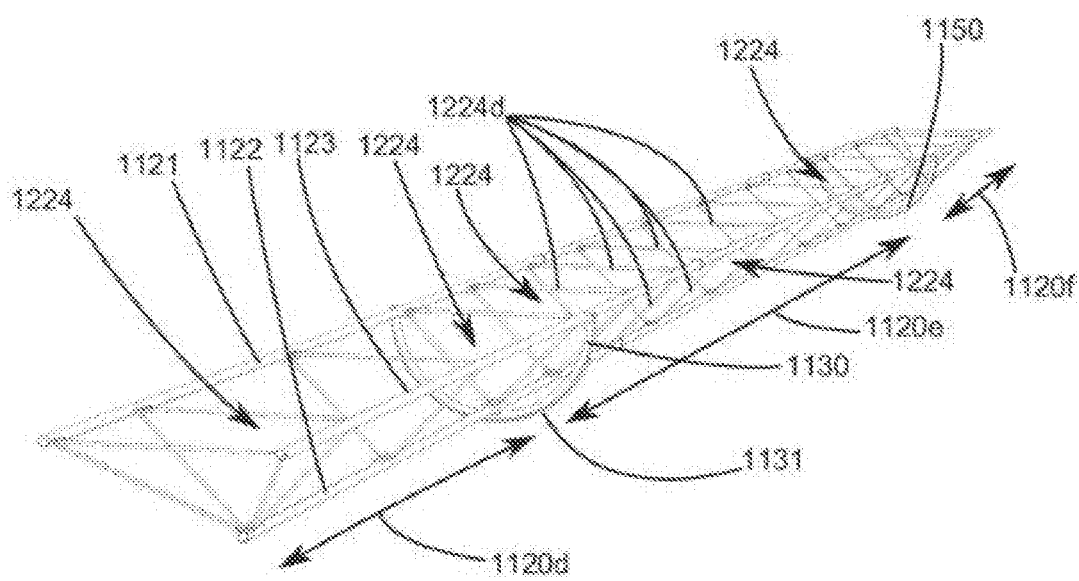

FIG. 3c shows the support structure 1120 without the tie rods 1225 and comprising only the longitudinal members 1121, 1122 and 1123, the crossmembers 1224d and the first support arch 1130 and the second support arch 1150. Note in this figure that the triangles situated at the ends of the support structure 1120 are preferably inclined relative to the other triangles of the support structure 1120, preferably being all parallel to one another.

In an advantageous embodiment, the first ground support 1140 and the second ground support 1160 are formed on a solar energy production site and the mobile device 1100 may be, preferably integrally, assembled in a factory, or even in a mobile workshop, so as to form a preferably one-piece complete assembly. This pre-assembled mobile device 1100 may then be installed, preferably directly, on the first ground support 1140 and on the second ground support 1160 once it has arrived at the solar energy production site. Indeed, the solar tracker 1000 in accordance with the present invention advantageously exploits its mechanical adaptability to static and/or dynamic irregularities of the ground and the environment of the production site, enabling it to be pre-assembled before it arrives at the production site in order to be installed easily and rapidly on the two ground supports 1140 and 1160. Among other things, this enables great savings of time and money in the construction of solar fields. If necessary, the inclination of the guide devices 1142, 1161 relative to the ground supports 1140, 1160 may be adjusted to compensate flatness defects of the terrain.

There will now be described, by way of nonlimiting example, the materials, the numerical values and the dimensions that may apply to the various elements of the present invention:

- The longitudinal members comprise at least one of the following materials: steel, aluminum, a composite material;
- The crossmembers comprise at least one of the following materials: steel, aluminum, a composite material;
- The tie rods comprise at least one of the following materials: steel;
- The support arches comprise at least one of the following materials: steel
- The distance L between the first and second ends of the support structure is preferably between 0 m and 45 m inclusive, preferably between 10 m and 42 m inclusive and advantageously between 20 m and 37 m inclusive;
- The distance L1 between the first end of the support structure and the first support arch is between 0 m and 6 m inclusive, preferably between 1 m and 6 m inclusive and advantageously between 1 m and 3 m;
- The distance L2 between the first support arch and the second support arch is between 0 m and 42 m inclusive, preferably between 1 m and 36 m inclusive and advantageously between 1 m and 24 m inclusive;
- The distance L3 between the second support arch and the second end of the support structure is between 0 m and 6 m inclusive, preferably between 1 m and 6 m inclusive and advantageously between 1 m and 3 m inclusive;
- The first distance P1 between two consecutive triangles disposed between the first end of the support structure and the first support arch is between 1 m and 6 m inclusive;
- The second distance P2 between two consecutive triangles disposed between the first support arch and the second support arch is between 1 m and 6 m inclusive;
- The third distance P3 between two consecutive triangles disposed between the second support arch and the second end of the support structure is between 1 m and 6 m inclusive;

Thus the present invention concerns a solar tracker comprising a support structure advantageously exploiting the mechanics of so-called lattice beams, that is to say mechanical structures configured to support a predetermined mechanical stress and each element of which is both shaped and disposed in such a manner that the support structure formed in this way is able to support the predetermined mechanical stress whilst having the lowest possible weight.

In the light of the foregoing description, it is clearly apparent that the invention proposes an effective solution for increasing the solar energy collection area for solar trackers adapted to rough terrain whilst having below average minimum material quantities, limited costs and limited materials.

The invention is not limited to the embodiments described but encompasses any embodiment within the scope of the claims.

REFERENCES

1000. Solar tracker
  1100. Mobile device
    1110. Table
      1111. Principal extension direction
      1112. Solar energy collector device
      1113. Beam
    1120. Support structure
      1120*a*. First end
      1120*b*. Second end
      1120*c*. Distance between the first end and the second end: L
      1120*d*. Distance between the first end and the first support arch: L1
      1120*e*. Distance between the first support arch and the second support arch: L2
      1120*f*. Distance between the second support arch and the second end: L3
      1121. First longitudinal member
      1122. Second longitudinal member
      1123. Third longitudinal member
      1224. Triangle
        1224*a*. First apex
        1224*b*. Second apex
        1224*c*. Third apex
        1224*d*. Crossmember
        1224*e*. First distance between two consecutive triangles: P1
        1224*f*. Second distance between two consecutive triangles: P2
        1224*g*. Third distance between two consecutive triangles: P3
      1225. Tie rod
        1225*a*. First tie rod
        1225*b*. Second tie rod
        1225*c*. Third tie rod
        1225*d*. Fourth tie rod
        1225*e*. Fifth tie rod
        1225*f*. Sixth tie rod
    1130. First support arch
      1131. Rolling strip
    1140. First ground support
      1140*a*. Sole
      1140*b*. Foot
      1140*c*. Inclination take-up bar
      1141. Kinematic drive device
        1141*a*. Motorization
        1141*b*. Principal rotation axis
        1141*c*. Inclination take-up axis
      1142. First guide device
        1142*a*. Upper support roller(s)
        1142*b*. Lower support roller(s)

1150. Second support arch
1151. Rolling strip
1160. Second ground support
  1160a. Sole
  1160b. Foot
  1160c. Inclination take-up bar
1161. Second guide device
  1161a. Upper support roller(s)
  1161b. Lower support roller(s)

The invention claimed is:

1. A solar tracker comprising at least:
  a mobile device comprising at least:
    a table extending longitudinally in a principal extension direction and comprising at least one solar energy collector device;
    a support structure extending longitudinally over a length L in the principal extension direction and supporting the table and comprising a first end and a second end;
    a first support arch and a second support arch configured to support the support structure;
    a first ground support and a second ground support configured to support the first support arch and the second support arch, respectively;
    a kinematic drive device configured to drive the mobile device in rotation relative to the first ground support and the second ground support;
  wherein the support structure is a beam formed of a rigid lattice structure comprising longitudinal members connected by crossmembers and tie rods, and
    wherein the mobile device is configured in such a manner that the support structure is entirely supported by the first support arch and the second support arch.

2. The solar tracker as claimed in claim 1, in which said support structure includes:
  at least one first, one second and one third parallel longitudinal members extending in the principal extension direction;
  a plurality of crossmembers distributed along the principal extension direction and interconnecting the first, second and third longitudinal members so that the crossmembers form a plurality of triangles;
  a plurality of tie rods mechanically interconnecting at least two triangles of the plurality of triangles.

3. The solar tracker as claimed in claim 2, in which said plurality of tie rods mechanically stresses the support structure in tension.

4. The solar tracker as claimed in claim 2, in which the first support arch and the second support arch are respectively situated at a first distance L1 from the first end and at a second distance L3 from the second end of the support structure so that the first end and the second end of the support structure are cantilevered from the first support arch and the second support arch.

5. The solar tracker as claimed in claim 4, in which the first distance L1 and the second distance L3 are between L/9 and L/2 inclusive, preferably between L/6 and L/2.5 inclusive and advantageously equal to L/3.

6. The solar tracker as claimed in claim 2, in which the plurality of triangles is disposed with an irregular distribution along said principal extension direction and in which the irregular distribution of the plurality of triangles along said principal direction preferably has a higher density of triangles at the level of the first support arch and/or the second support arch, preferably at the level of the first support arch.

7. The solar tracker as claimed in claim 2, in which the distance between two consecutive triangles in the principal extension direction is equal to P1 between the first end and the first support arch, equal to P3 between the second support arch and the second end, and equal to P2 between the first support arch and the second support arch, with P3 being equal to P1 and P2 being less than or equal to P1.

8. The solar tracker as claimed in claim 2, comprising at least four, preferably at least five and advantageously at least seven triangles between the first support arch and the second support arch.

9. The solar tracker as claimed in claim 8, in which the distance between two consecutive triangles disposed between the first support arch and the second support arch increases as a function of the distance thereof relative to the first support arch.

10. The solar tracker as claimed in claim 2, in which at least one crossmember is disposed relative to the first support arch along its diameter and in which at least one crossmember is preferably disposed relative to the second support arch along its diameter.

11. The solar tracker as claimed in claim 2, in which the triangles are equilateral triangles and in which the triangles extend in planes orthogonal to the principal extension direction.

12. The solar tracker as claimed in claim 2, in which each triangle comprises:
  at least one first apex disposed at the level of the first longitudinal member;
  at least one second apex disposed at the level of the second longitudinal member;
  at least one third apex disposed at the level of the third longitudinal member;
  and in which each first apex of a triangle is connected via at least one tie rod to at least one second apex and to at least one third apex of at least one other triangle.

13. The solar tracker as claimed in claim 12, in which each second apex of a triangle is connected via at least one tie rod to at least one first apex and to at least one third apex of at least one other triangle.

14. The solar tracker as claimed in claim 12, in which each third apex of a triangle is connected via at least one tie rod to at least one first apex and to at least one second apex of at least one other triangle.

15. The solar tracker as claimed in claim 2, in which the section, typically the diameter, of at least some of the tie rods, is proportional to their length.

16. The solar tracker as claimed in claim 1, further comprising rolling members mounted to rotate on the first ground support and the second ground support, the rolling members being configured in such a manner as to guide rotation of the first arch and the second arch and on their own to support the mobile device.

17. The solar tracker as claimed in claim 16, in which the first ground support comprises at least two support rollers forming a rolling member and configured to roll on a rolling strip carried by the first support arch and configured to support on their own and to guide the first support arch and in which the kinematic drive device comprises a transmission member configured to cooperate with a complementary transmission member carried by the first support arch in such a manner as to enable driving of the first support arch in rotation relative to the first ground support and in which the second ground support comprises at least two support rollers forming a rolling member and configured to roll on a rolling strip carried by the second support arch and configured to support on their own and to guide the rotation of the second support arch relative to the second ground support.

18. The solar tracker as claimed in claim 16, in which the first ground support comprises at least one sole disposed on the ground and at least two feet fastened to the sole and supporting on their own the rolling members via an inclination take-up bar mounted to rotate freely about an inclination take-up axis perpendicular to the principal extension direction and in which the second ground support comprises at least one sole disposed on the ground and at least two feet fastened to the sole and supporting on their own the rolling members via an inclination take-up bar mounted to rotate freely about an inclination take-up axis perpendicular to the principal extension direction.

19. A solar field comprising a plurality of solar trackers as claimed in claim 1, at least some of the solar trackers being disposed parallel to one another, in the North/South direction.

\* \* \* \* \*